Oct. 27, 1942.  W. VAN DER SLUYS ET AL  2,299,943
RAILWAY EQUIPMENT
Filed June 27, 1940
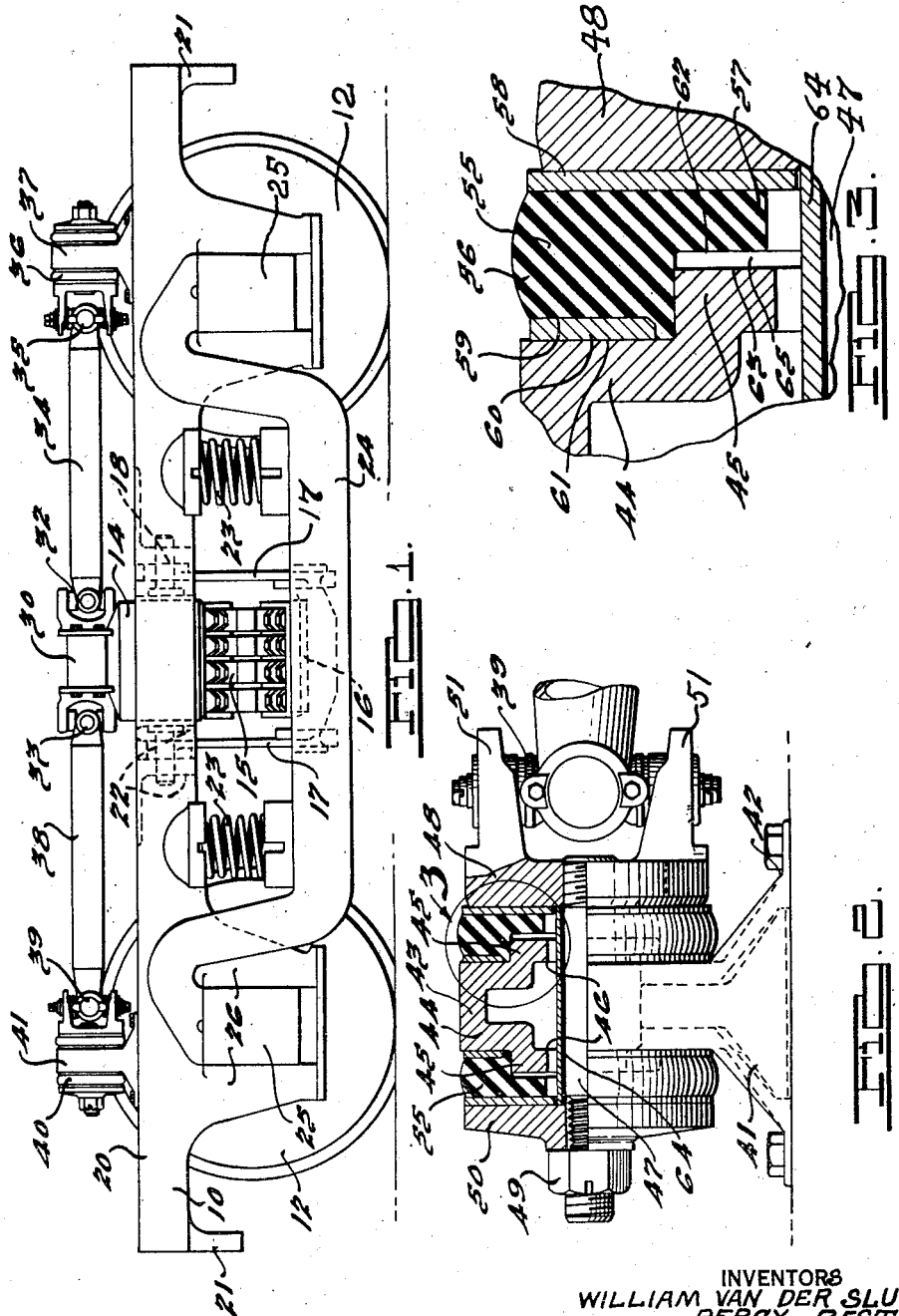
INVENTORS
WILLIAM VAN DER SLUYS AND
PERCY BEST.
BY
ATTORNEYS.

Patented Oct. 27, 1942

2,299,943

UNITED STATES PATENT OFFICE 2,299,943

RAILWAY EQUIPMENT

William Van Der Sluys and Percy Best, Detroit, Mich., assignors, by mesne assignments, to Railroad Rolling Stock Patents Corporation, a corporation of Delaware Application June 27, 1940, Serial No. 342,751

9 Claims. (Cl. 105—190)

Our invention relates to railway equipment and pertains particularly to an improvement in trucks for use on such equipment.

One object of our invention is to provide a novel type of mechanism to prevent the bolster of a truck from frictionally engaging any portion of the truck frame during normal operation and at the same time permit relatively free vertical and lateral movement therebetween.

Another object of our invention consists in providing a novel means whereby a truck bolster is permitted to move freely with respect to the associated truck frame in both vertical and lateral directions, and is permitted to move longitudinally of the truck frame to only a limited degree from a central position thereon, and whereby such longitudinal movement is resiliently opposed.

A further object of our invention is to provide a novel type of thrust link which is adapted to permit lateral and vertical movements of a bolster of a truck and to limit longitudinal movement thereof within predetermined limits, and which is light in weight, inexpensive to manufacture, readily replaceable and easily inspected.

For a better understanding of our invention reference may now be had to the accompanying drawing, of which:

Fig. 1 is a side elevational view of a railway car truck embodying our invention.

Fig. 2 is a detail cross sectional view of a portion of the structure illustrated in Fig. 1, the view being taken on a vertical longitudinal plane passing through the thrust link mounting on the frame of the truck.

Fig. 3 is an enlarged view of a portion of Fig. 2, showing the rubber unit in detail.

In the drawing we have illustrated a railway car truck of the type normally used on passenger cars comprising a truck frame 10 on which, by means of wheel axles, not shown, are mounted the usual rail engaging wheels 12. The weight of the car body is carried on a normally laterally extending truck bolster member 14, the ends of which are supported upon two sets of elliptical leaf springs 15, which in turn rest upon a transversely extending spring plank 16. This spring plank 16 is supported at its ends upon swing links 17 which are pivotally mounted upon the truck frame 10 as illustrated at 18. The truck frame comprises the usual longitudinally extending side members 20, transversely extending end members 21 and transversely extending intermediate members 22, generally called transoms, on which the swing links 17 are pivotally mounted.

The truck frame 10 rests at each end on two spaced coiled springs 23 which, in turn, rest upon an equalizer bar 24 the ends of which rest on the tops of wheel axle journal boxes 25. The journal boxes 25 are confined between guide members 26, constituting a portion of the side frames 20, and serving to limit the movement of the journal boxes to movement in a vertical direction only.

Our invention is particularly directed to means for preventing longitudinal displacement of the bolster members 14 so as to prevent engagement between the bolster members 14 and the transom members 22. When these members are in engagement the frictional resistance to movement therebetween causes any forces transmitted to the truck frame to be transmitted directly to the bolster member and thus to the car body, to the discomfort of the passengers. This is true because the leaf spring members 15 are short-circuited by the engagement of the bolster members 14 and the transom members 22. At the same time it is desirable that the bolster member 14 be permitted to move freely both in vertical and lateral directions in order that the springs 15 and the swing links 17 may perform their functions of diminishing, cushioning and eliminating undesirable shocks being transmitted from the car body to the truck frame, In order to prevent undue movement of the bolster longitudinally of the truck frame we have provided mounting members 30, one of which is rigidly secured to each end of the bolster member 14. Secured to each of the mounting members 30 are two universal joints 32 and 33, the former being secured to the rearward side and the latter to the forward side thereof. The expressions "forward" and "rearward" side are employed for purposes of clarity although both ends of the truck are identical in construction. Secured to the universal joints 32 are a pair of rigid link members 34, one on each side of the truck, which extend rearwardly to universal joints 35 which in turn are connected to a resilient unit 36 supported on a mounting 37 secured to the truck frame 10 adjacent the rear end thereof. The links 34 extend longitudinally of the truck frame as long as the bolster member 14 is centrally disposed with respect to the truck frame but the universal joints 32 and 35 permit freedom of transverse and vertical movement thereof with respect to the truck frame.

In like manner a pair of links 38, one at each end of the bolster, are secured to the universal joints 33 and are in turn secured by means of universal joints 39 to a resilient unit 40 supported upon a mounting 41 secured to the truck frame adjacent the forward ends thereof. The links 38, similarly to the links 34, normally extend longitudinally of the truck frame 10. By this construction the bolster member 14 is held in spaced relationship longitudinally of the truck frame with respect to the transoms 22 by means of four pivoted links, two secured to each end thereof and one pair extending forwardly and the other pair extending rearwardly.

As best illustrated in Figs. 2 and 3, the mounting members 37 and 41, which are identical, consist of a supporting base 42 by means of which it is secured to the truck frame and an upright portion 43. The portion 43 is in the form of an annulus, the center portion 44 of which is of relatively large diameter and relatively narrow, and two side portions 45, which constitute annuli, and which are of relatively smaller diameter and of relatively greater width. The interior of the mounting 41 is hollow and the portions 45 are provided with an aperture 46 therein through which a bolt 47 extends. The bolt 47 is secured in threaded engagement with a rigid metallic plate 48 on one side of the upright member 43 and by a nut 49 is secured to a rigid metallic plate 50 on the opposite side thereof. The plate 48 is provided with integral arms 51 to which is secured the universal joint 39. Disposed between each of the plates 48 and 50 and the standard 43 is a rubber unit 55, as best illustrated in cross section in Fig. 3.

Each rubber unit 55 consists of an annulus of rubber which is of relatively great width adjacent its outer periphery 56 and which is relatively narrow in width adjacent its inner periphery 57. One side of the annulus is substantially flat and straight and has secured thereto by bonding a relatively wide flat annular metallic plate 58, which engages a correspondingly shaped surface on the plate 48. The opposite side of the rubber annulus 55 is of stepped construction so as to cooperate with the stepped construction of the mounting 43 formed by the outer surfaces of the annular portions 44 and 45, the rubber member 55 having a substantially flat surface 59 to which is secured a relatively narrow flat annular plate 60, adapted to engage the sides 61 of the annulus 44. The plate 60 is likewise bonded to the rubber member 55 by vulcanizing to a brass plated surface or the like.

One side of the inner portion of the rubber annulus 55 is relatively narrow in width and presents a face 62 which is exposed in the sense that it has no metallic plate vulcanized thereto and which, when the unit is assembled, is disposed opposite but spaced from a side face 63 on the annulus 45 of the mounting 41. The bolt 47 is provided with a centrally disposed sleeve 64 which surrounds the bolt and is disposed within the openings in the annuli 44, 45, 55, 58 and 60 but engages at its ends the rigid plates 48 and 50. The purpose of the sleeve 64 is to permit drawing the plates 48 and 50 together so as to compress the outer portion of the rubber annulus but to prevent compression of the inner portion of the rubber annulus, thus forming a gap 65, as best shown in Fig. 3, between the surfaces 62 of the rubber annulus and the surface 63 of the mounting annulus 45.

The purpose of this gap is to provide a portion of the rubber member which is not normally under compression by reason of the tension exerted by the bolt 47 and which comes into play by way of resisting movement of one or the other of the plates 48 and 50 toward the mounting by means of an increased resisting force which is exerted after the gap 65 has been closed. In other words, in the normal operation of the vehicles with light loads the preloading of the thicker portion of the rubber sufficient to prevent longitudinal shifting of the bolster with respect to the truck frame and to provide a soft cushioning effect on movement transmitted thereto. In the event, however, that the truck or the car body is submitted to a force sufficiently violent in nature that the compression of the outer portion of the rubber is not sufficient to absorb the load, the second or narrower portion of the rubber then engages the face 63 and adds its resistance to deformation to that already exerted by the wider portion of the rubber. In this manner we have secured a resilient unit which is amply strong to transmit any forces to which the car may be subjected which permits a relatively slight amount of longitudinal movement of the bolster member but which prevents excessive movement thereof and which transmits a relatively light force through a gently yielding medium and which transmits a relatively heavier force through the same medium providing a materally increased resistance to deformation thereof. In other words, the rate of deflection of the resilient unit is increased as the deflecting force is increased beyond a predetermined amount.

Although we have illustrated but one form of our invention, and have described in detail but a single application, it will be apparent to those skilled in the art that our invention is not so limited but that various minor changes and modifications may be made therein without departing from the spirit of our invention or from the scope of the appended claims.

We claim:

1. In a railway vehicle truck, a truck frame, a truck bolster member movable relatively to said truck frame, and means for maintaining said bolster member within predetermined limits of movement with respect to said frame comprising a mounting on said bolster member, a mounting on said truck frame, linkage means extending between said mountings, means connecting said linkage means to one of said mountings, and a second means adapted to secure said linkage means to the other mounting, said second means comprising two spaced rigid plates secured to said linkage and disposed on opposite sides of said mounting in spaced relationship therewith, and rubber members disposed intermediate said mounting and each of said rigid plates, said rubber members comprising portions respectively adapted to be placed in compression under different degrees of stress by movement of said bolster.

2. In a railway vehicle truck, a truck frame, a truck bolster member movable relatively to said truck frame, and means for maintaining said bolster member within predetermined limits of movement with respect to said frame comprising a mounting on said bolster member, a mounting on said truck frame, linkage means extending between said mountings, means connecting said linkage means to one of said mountings, and a second means adapted to secure said linkage means to the other mounting, said second means comprising two spaced rigid plates secured to said linkage and disposed on opposite sides of said mounting in spaced relationship therewith, and rubber members disposed intermediate said mounting and each of said rigid plates, said rubber members being of stepped construction and so disposed that one step is substantially flexed before stress is exerted on the next adjacent step.

3. In a railway vehicle truck, a truck frame, a truck bolster member movable relatively to said truck frame, and means for maintaining said bolster member within predetermined limits of movement with respect to said frame comprising a mounting on said bolster member, a mounting on said truck frame, linkage means extending between said mountings, means connecting said linkage means to one of said mountings, and a second means adapted to secure said linkage means to the other mounting, said second means comprising two spaced rigid plates secured to said linkage and disposed on opposite sides of said mounting in spaced relationship therewith, and rubber members disposed intermediate said mounting and each of said rigid plates, said rubber members having portions of different thicknesses and adapted to have the thicker portion materially compressed before the relatively thinner portion is compressed.

4. In a railway vehicle truck, a truck frame, a truck bolster member movable relatively to said truck frame, and means for maintaining said bolster member within predetermined limits of movement with respect to said frame comprising a mounting on said truck frame, linkage means extending between said mountings, means connecting said linkage means to one of said mountings, and a second means adapted to secure said linkage means to the other mounting, said second means comprising a plate secured to said linkage and disposed adjacent one side of said mounting, a plate on the opposite side of said mounting, rubber members having portions of several different thicknesses disposed intermediate said plates and said mounting, and means adapted to hold said plates in engagement with said rubber members so as to compress the thicker portions thereof and leave the thinner portions uncompressed.

5. In a railway vehicle truck, a truck frame, a truck bolster member movable relatively to said truck frame, and means for maintaining said bolster member within predetermined limits of movement with respect to said frame comprising a mounting on said bolster member, a mounting on said truck frame, linkage means extending between said mountings, means connecting said linkage means to one of said mountings, and a second means adapted to secure said linkage means to the other mounting, said second means comprising a plate secured to said linkage and disposed adjacent one side of said mounting, a plate on the opposite side of said mounting, rubber members having portions of several different thicknesses disposed intermediate said plates and said mounting, threaded means adapted to engage said plates and draw them into engagement with said rubber members, and a rigid spacing means extending between said plates of sufficient length to permit said threaded means to compress the thicker portions of the rubber members and prevent said threaded means from compressing the thinner portions thereof.

6. In a railway vehicle truck, a truck frame, a truck bolster member movable relatively to said truck frame, and means for maintaining said bolster member within predetermined limits of movement with respect to said frame comprising a mounting on said bolster member, a mounting on said truck frame, linkage means extending between said mountings, means connecting said linkage means to one of said mountings, and a second means adapted to secure said linkage means to the other mounting, said second means comprising a plate pivotally secured to said linkage means and disposed in proximity to said mounting, a second plate disposed on the opposite side of said mounting, rubber members disposed intermediate said plates and said mounting, and threaded means adapted to engage both of said plates to compress the rubber members therebetween.

7. A resilient unit comprising an upright standard having a transversely disposed aperture extending therethrough, said standard having a portion of annular contour relatively narrow in width and relatively large in diameter and a portion of annular contour relatively wide and relatively smaller in diameter, a pair of annular plates disposed on opposite sides of said standard, a resilient member disposed between each plate and said standard comprising annular rubber elements having a portion of relatively great diameter and relatively wide compressed between a surface of one of said plates and a surface of said relatively narrow portion of said standard and a portion of relatively small diameter and relatively narrow, disposed between a surface of said plate and a surface of said relatively wide portion of said standard with one of its sides normally in spaced relation to one of said latter surfaces and means adapted to draw said plates towards each other so as to compress said relatively wide portion of said rubber elements.

8. A resilient unit comprising an upright standard having a transversely disposed aperture extending therethrough, said standard having a portion of annular contour relatively narrow in width and relatively large in diameter and a portion of annular contour relatively wide and relatively smaller in diameter, a pair of annular plates disposed on opposite sides of said standard, a resilient member disposed between each plate and said standard comprising annular rubber elements having a portion of relatively great diameter and relatively wide and a portion of relatively small diameter and relatively narrow, and means adapted to draw said plates towards each other so as to compress the relatively wide rubber portion against the relatively narrow portion of the standard to compress the same before the relatively narrow rubber portion engages the relatively wide portion of the standard.

9. A resilient unit comprising an upright standard having a transversely disposed aperture extending therethrough, said standard having a portion of annular contour relatively narrow in width and relatively large in diameter and a portion of annular contour relatively wide and relatively smaller in diameter, a pair of annular plates disposed on opposite sides of said standard, a resilient member disposed between each plate and said standard comprising annular rubber elements having a portion of relatively great diameter and relatively wide and a portion of relatively small diameter and relatively narrow, threaded means disposed within said annuli engaging said plates and adapted to draw said plates towards each other so as to compress the relatively wide rubber portion against the relatively narrow portion of the standard, and a sleeve surrounding the central portion of said threaded means adapted to prevent said threaded means from compressing the relatively narrow rubber portion against the relatively wide portion of the standard.

WILLIAM VAN DER SLUYS.
PERCY BEST.